(12) United States Patent
Cymbal et al.

(10) Patent No.: US 8,448,987 B2
(45) Date of Patent: May 28, 2013

(54) ADJUSTABLE STEERING COLUMN UTILIZING A SLEEVE AND A METHOD OF FORMING A FILLER WITH A SLEEVE

(75) Inventors: William D. Cymbal, Freeland, MI (US); Richard K. Riefe, Saginaw, MI (US); Ravi Ravindra, Saginaw, MI (US); Rosemary L. Kramer, Saginaw, MI (US); Daniel N. Crishon, Saginaw, MI (US); David M. Schluckebier, Hemlock, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 71 days.

(21) Appl. No.: 13/306,425

(22) Filed: Nov. 29, 2011

(65) Prior Publication Data
US 2012/0067159 A1    Mar. 22, 2012

Related U.S. Application Data

(62) Division of application No. 11/726,210, filed on Mar. 21, 2007, now Pat. No. 8,092,635.

(51) Int. Cl.
*B62D 1/18* (2006.01)

(52) U.S. Cl.
USPC ............ 280/775; 280/777; 74/493; 180/78

(58) Field of Classification Search
USPC ............ 280/775, 776, 777; 180/78; 74/493, 74/494
See application file for complete search history.

(56) References Cited

U.S. PATENT DOCUMENTS

| 2,388,541 | A | 11/1945 | Henderson |
| 2,753,799 | A | 7/1956 | Rice |
| 3,662,515 | A | 5/1972 | Stuberg |
| 3,799,569 | A | 3/1974 | Baker |
| 3,914,116 | A | 10/1975 | Westlin |
| 3,949,623 | A | 4/1976 | Fujiwara et al. |
| 4,058,853 | A | 11/1977 | Boxer et al. |

(Continued)

FOREIGN PATENT DOCUMENTS

| DE | 10343685 A1 | 4/2005 |
| EP | 0180535 A1 | 5/1986 |

(Continued)

OTHER PUBLICATIONS

Donald V. Rosato, et al., Concise Encyclopedia of Plastics, 2000, pp. 86-88.

(Continued)

*Primary Examiner* — Toan To
(74) *Attorney, Agent, or Firm* — Cantor Colburn LLP

(57) ABSTRACT

A steering column assembly has an outer jacket extending, an inner jacket is slideably disposed in the outer jacket for telescoping movement relative to the outer jacket, and a sleeve disposed between the inner and outer jackets. The sleeve exerts a predetermined frictional force on the inner jacket opposing the telescoping movement. A filler formed from a liquid thermosetting composition is disposed between the sleeve and the outer jacket for securing the sleeve to the outer jacket. Furthermore, a method of forming the steering column assembly includes disposing the inner jacket into the outer jacket and disposing the sleeve between the inner and outer jackets. The method further includes inserting the liquid thermosetting composition into the outer jacket between the outer jacket and the sleeve and curing the liquid thermosetting composition to form the filler.

10 Claims, 4 Drawing Sheets

U.S. PATENT DOCUMENTS

| | | | |
|---|---|---|---|
| 4,369,970 | A | 1/1983 | Salminen |
| 4,397,073 | A | 8/1983 | Walter |
| 5,086,661 | A | 2/1992 | Hancock |
| 5,243,874 | A | 9/1993 | Wolfe et al. |
| 5,345,679 | A | 9/1994 | Lennon et al. |
| 5,632,562 | A | 5/1997 | Kidzun et al. |
| 5,640,884 | A | 6/1997 | Fujiu et al. |
| 5,722,300 | A * | 3/1998 | Burkhard et al. ............... 74/493 |
| 5,758,545 | A * | 6/1998 | Fevre et al. .................... 74/493 |
| 5,833,064 | A | 11/1998 | Ayres et al. |
| 6,016,004 | A | 1/2000 | Schrock |
| 6,223,619 | B1 | 5/2001 | Shibata et al. |
| 6,389,923 | B1 | 5/2002 | Barton et al. |
| 6,473,968 | B1 | 11/2002 | Mastrofrancesco et al. |
| 7,168,741 | B2 * | 1/2007 | Kinme et al. ................. 280/777 |
| 7,784,830 | B2 * | 8/2010 | Ulintz ........................... 280/775 |
| 7,975,569 | B2 * | 7/2011 | Klos ............................... 74/493 |
| 8,096,036 | B2 * | 1/2012 | Dubay et al. .................... 29/434 |
| 2002/0121014 | A1 | 9/2002 | Barton et al. |
| 2005/0156423 | A1 * | 7/2005 | Appleyard .................... 280/777 |
| 2005/0200111 | A1 | 9/2005 | Cymbal et al. |
| 2005/0262960 | A1 | 12/2005 | Cymbal et al. |
| 2007/0113701 | A1 * | 5/2007 | Streng et al. .................... 74/492 |

FOREIGN PATENT DOCUMENTS

| | | |
|---|---|---|
| EP | 1101686 A1 | 5/2001 |
| EP | 1669272 A2 | 6/2006 |
| FR | 2575137 A1 | 6/1986 |
| WO | 9908013 A1 | 2/1999 |

OTHER PUBLICATIONS

European Search Report dated Nov. 19, 2009 for European Application No. 08152375.5-1264 / 1972523.

* cited by examiner

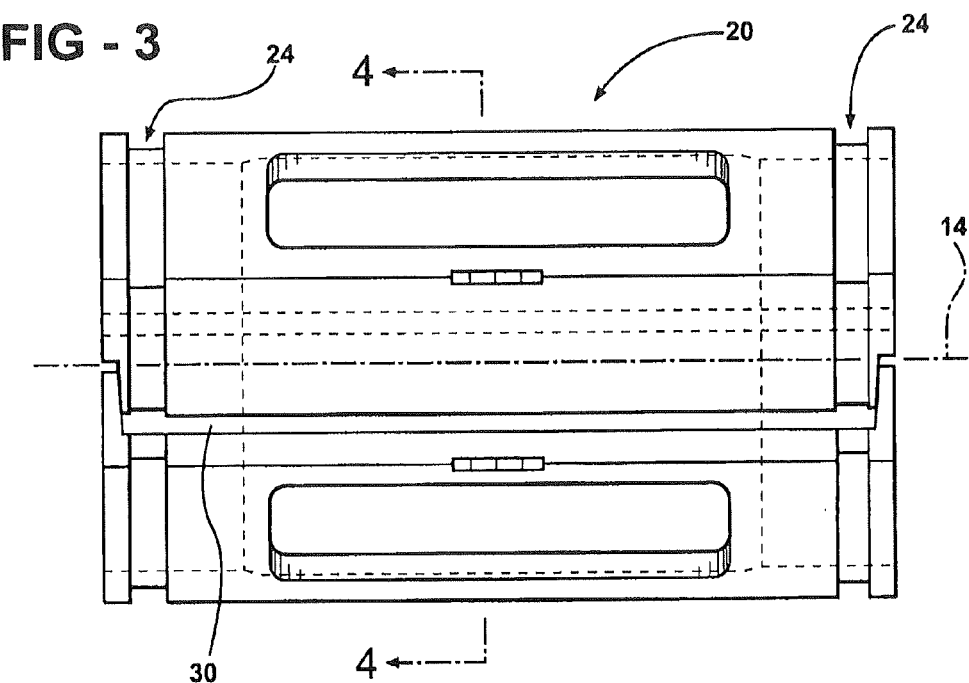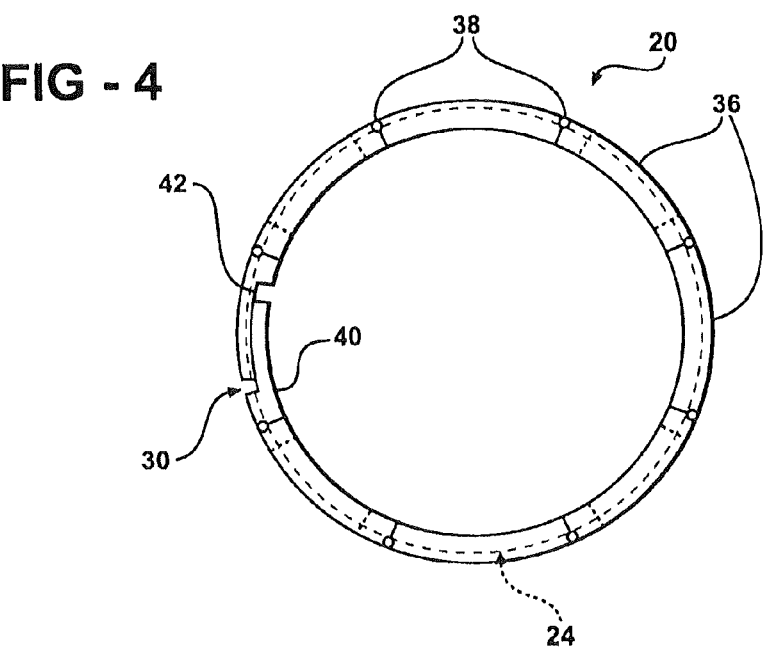

ADJUSTABLE STEERING COLUMN UTILIZING A SLEEVE AND A METHOD OF FORMING A FILLER WITH A SLEEVE

CROSS-REFERENCES TO RELATED APPLICATIONS

This application is a Divisional Application of U.S. patent application Ser. No. 11/726,210, filed Mar. 21, 2007 which is incorporated herein, by reference, in its entirety.

BACKGROUND OF THE INVENTION

1. Field of the Invention

The present invention generally relates to a steering column assembly.

2. Description of the Related Art

Various steering column assemblies providing telescoping movement are known in the art. Generally, the telescoping steering column assemblies of the prior art include an outer jacket and an inner jacket slideably disposed in the outer jacket. A bushing is disposed inside the outer jacket and the inner jacket slides into the bushing. The bushing provides a frictional force that opposes telescoping movement and that frictional force must be overcome before the steering column may telescope. For the bushing to exert the frictional force, molten plastic is injected into an injection hole defined by the outer jacket at a high pressure. The injection pressure forces the bushing to conform to the shape of the inner jacket, which causes the frictional force to be exerted on the inner jacket. Typically, the frictional force is overcome by either a user pulling or pushing on the steering column or by the steering column telescoping electronically. One such telescoping steering column assembly is shown in U.S. Pat. No. 5,722,300 to Burkhard et al. (the '300 patent). The '300 patent discloses the bushing disposed in the outer jacket, and the inner jacket is disposed in the bushing. Once inserted, molten plastic is injected into the outer jacket to compress the bushing around the inner jacket.

Although telescoping steering column assemblies of the prior art are enjoyed by a wide variety of consumers, the injection pressure of the molten plastic can be difficult to control. Since the frictional force is a function of the injection pressure, the frictional force is difficult to predict and is inconsistent between steering column assemblies. Therefore, a steering column assembly is needed that provides a more consistent frictional force on the inner jacket opposing telescoping movement. Also, a steering column assembly is needed that provides a stronger bond than the molten plastic materials used in the steering column assemblies of the prior art.

SUMMARY OF THE INVENTION

The subject invention provides a steering column assembly having an outer jacket extending along a longitudinal axis. An inner jacket is slideably disposed in the outer jacket for telescoping movement relative to the outer jacket along the longitudinal axis. A sleeve is disposed between the inner and outer jackets along the longitudinal axis for exerting a predetermined frictional force on the inner jacket opposing the telescoping movement. A filler is formed from a liquid thermosetting composition disposed between the sleeve and the outer jacket for securing the sleeve to the outer jacket and for maintaining the predetermined frictional force exerted by the sleeve on the inner jacket.

The subject invention further provides a method of forming the steering column assembly. The method includes the steps of disposing the inner jacket into the outer jacket and disposing the sleeve between the inner and outer jackets to exert the predetermined frictional force on the inner jacket opposing the telescoping movement. The method further includes the step of inserting the liquid thermosetting composition into the outer jacket between the outer jacket and the sleeve. In addition, the method includes a step of curing the liquid thermosetting composition to form the filler and secure the sleeve to the outer jacket to maintain the predetermined frictional force opposing the telescoping movement.

The filler formed from the liquid thermosetting composition disposed between the sleeve and the outer jacket allows the sleeve to exert the predetermined frictional force on the inner jacket more consistently than molten plastic used with the steering column assemblies of the prior art. Also, forming the filler from the liquid thermosetting composition provides a stronger bond between the sleeve and the outer jacket than the molten plastic materials used with the prior art steering column assemblies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a side view of the sleeve of FIG. 2 having grooves and a plurality of segments;

FIG. 4 is a front view of the sleeve of FIG. 2;

DETAILED DESCRIPTION

Figure 1:
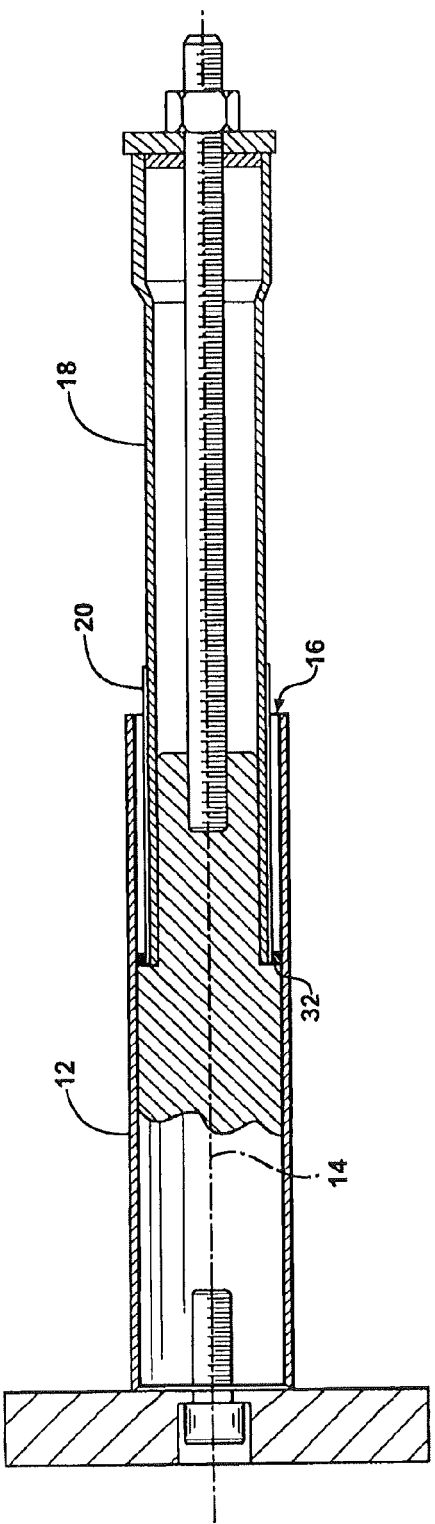
FIG. 1 is a cross-sectional side view of a first embodiment of a steering column assembly having a sleeve disposed between an inner jacket and an outer jacket along a longitudinal axis.

Referring to the Figures, wherein like numerals indicate corresponding parts throughout the several views, a steering column assembly 10 is shown generally at numeral 10. As shown in FIG. 1, the steering column assembly 10 includes an outer jacket 12 extending along a longitudinal axis 14. Typically, the outer jacket 12 is used to mount the steering column assembly 10 to a vehicle. The outer jacket 12 typically has a tube-shaped configuration and may have a cylindrical cross-section, a rectangular cross-section, or any other cross-section known in the art to define an opening 16. The opening 16 is defined in the outer jacket 12 along the longitudinal axis 14.

An inner jacket 18 is slideably disposed in the outer jacket 12 and is typically used to support the steering wheel in the outer jacket 12. The inner jacket 18 typically has a tube-shaped configuration and may have a cylindrical cross-section, a rectangular cross-section, or any other cross-section known in the art that may fit inside the outer jacket 12. Typically, the inner jacket 18 has the same cross-sectional shape as the outer jacket 12. The inner jacket 18 is disposed in the opening 16 of the outer jacket 12, which allows the inner jacket 18 to be coaxially aligned with the outer jacket 12 along the longitudinal axis 14 such that the inner jacket 18 is able to move telescopically relative to the outer jacket 12 along the longitudinal axis 14. When disposed in the opening 16 and during telescoping movement, the inner jacket 18 is spaced from the outer jacket 12. In other words, the portion of the inner jacket 18 that is disposed within the outer jacket 12 is not in direct contact with the outer jacket 12. It is to be appreciated that other portions of the inner jacket 18 may be in direct contact with the outer jacket 12 at various times during telescoping movement.

To separate the inner jacket 18 from the outer jacket 12 during telescoping movement, a sleeve 20 is disposed between the inner and outer jackets 12, 18 along the longitudinal axis 14. The sleeve 20 is mounted to the outer jacket 12 so that the sleeve 20 does not move along the longitudinal axis 14 during telescoping movement. However, the inner jacket 18 slides inside the sleeve 20 during telescoping movement. When disposed between the inner jacket 18 and the outer jacket 12, the sleeve 20 exerts a predetermined frictional force on the inner jacket 18, which opposes the telescoping movement of the inner jacket 18 relative to the outer jacket 12. This predetermined frictional force must be overcome in order for the inner jacket 18 to telescope relative to the outer jacket 12.

Figure 2:
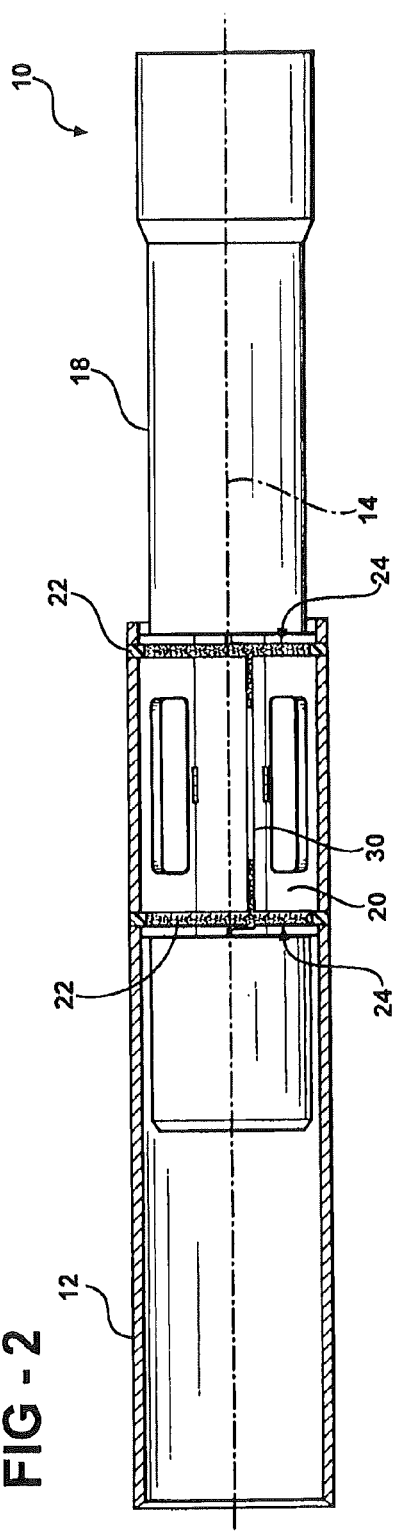
FIG. 2 is a partial cross-sectional side view of an alternative embodiment of the sleeve disposed between the inner jacket and the outer jacket along the longitudinal axis.

Referring now to FIG. 2, when the sleeve 20 is mounted in the outer jacket 12, a filler 22 is disposed between the sleeve 20 and the outer jacket 12. The filler 22 is shown partially in cross-section. The filler 22 is formed from a liquid thermosetting composition and is the reaction product of a resin and a cross-linking agent. The resin may be an epoxy and the cross-linking agent may be an anhydride. Those skilled in the art realize that other resins and cross-linking agents may be used within the scope of the invention. The liquid thermosetting composition is cured by adding the anhydride to the resin. Once cured, the liquid thermosetting composition becomes the filler 22. It is to be appreciated that the filler 22 is classified as a thermoset material, and therefore the filler 22 includes the physical and chemical properties associated with a thermoset material as is known in the art, as opposed to a thermoplastic material.

Figure 7:
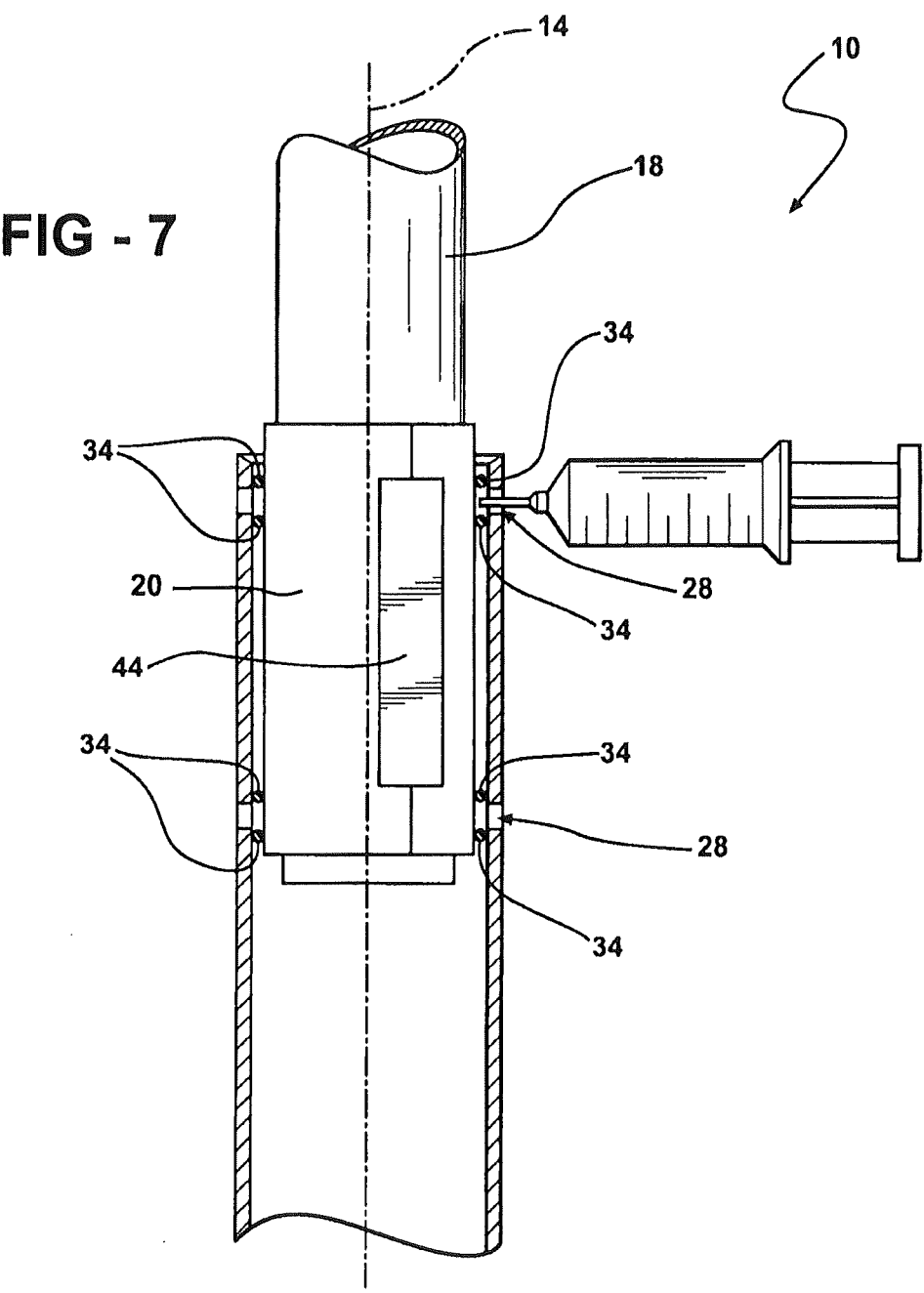
FIG. 7 is a partial cross-sectional side view of the steering column assembly with the liquid thermosetting composition being injected between the sleeve and the outer jacket of FIG. 1 through a hole defined by the outer jacket.

As shown in FIGS. 2-4, in one embodiment, the sleeve 20 defines at least one groove 24 and the filler 22 is disposed in the groove 24 between the sleeve 20 and the outer jacket 12. In this embodiment, the sleeve 20 defines an outer perimeter 26 and the at least one groove 24 extends around the outer perimeter 26 of the sleeve 20. In other words, the at least one groove 24 extends completely around the sleeve 20. The filler 22 secures the sleeve 20 to the outer jacket 12 and maintains the predetermined frictional force exerted by the sleeve 20 on the inner jacket 18. As shown in FIG. 7, the liquid thermosetting composition may be inserted into the groove 24 through a hole 28 defined by the outer jacket 12. When the inner jacket 18 and sleeve 20 are mounted to the outer jacket 12, the hole 28 is aligned with the groove 24 and is in communication with the groove 24, which allows the liquid thermosetting composition to travel through the hole 28 and into the groove 24. Referring back to FIGS. 2-4, to prevent an overflow of the liquid thermosetting liquid, the sleeve 20 may define an overflow gap 30 in communication with the groove 24. The overflow gap 30 extends transverse to the groove 24 and receives the liquid thermosetting composition when the groove 24 is filled. It is to be understood that the sleeve 20 may have a single groove 24, and the filler 22 is disposed in the groove 24 to secure the sleeve 20 to the outer jacket 12. Alternatively, the sleeve 20 may define a plurality of grooves 24, and the grooves 24 are spaced from one another around the outer perimeter 26 of the sleeve 20. The filler 22 is disposed in each groove 24 to secure the sleeve 20 to the outer jacket 12. In either of these alternatives, the sleeve 20 may partially abut the outer jacket 12. It is to be understood that the sleeve 20 may have any number of grooves 24, and the filler 22 may be disposed in each of the grooves 24.

Figure 6:
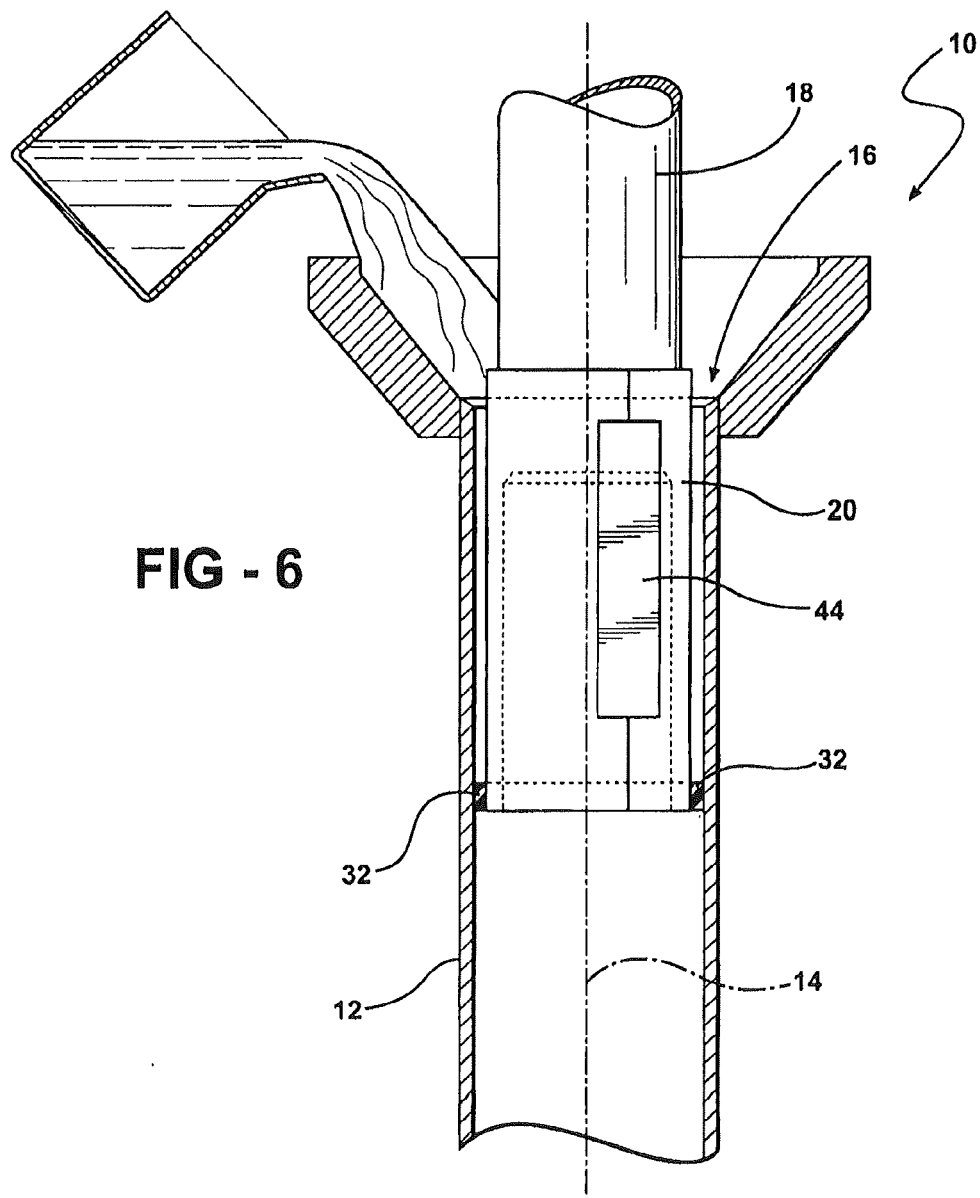
FIG. 6 is a partial cross-sectional side view of the steering column assembly with a liquid thermosetting composition being poured between the sleeve and the outer jacket of FIG. 1 through an opening defined by the outer jacket.

As shown in FIG. 6, in another embodiment, instead of the at least one groove 24, the sleeve 20 has no grooves 24, and is spaced from the outer jacket 12 when disposed between the inner jacket 18 and the outer jacket 12. Instead of filling in the groove 24, the filler 22 may fill in the entire space between the outer jacket 12 and the sleeve 20. A seal 32, such as an o-ring, may be disposed on the sleeve 20 to hold the filler 22 onto the sleeve 20. Those skilled in the art realize that other seals 32 may be used to hold the filler 22 onto the sleeve 20. This embodiment is preferred when the liquid thermosetting composition is poured between the outer jacket 12 and the sleeve 20 through the opening 16. However, the liquid thermosetting composition may be inserted between the outer jacket 12 and the sleeve 20 through the hole 28 as described in the previous embodiment. When inserted through the hole 28, a guide 34 may be disposed about the sleeve 20 between the sleeve 20 and the outer jacket 12 instead of a single seal 32. The guide 34 is in communication with the hole 28 defined by the outer jacket 12. The guide 34 may include a pair of seals 32 disposed about the sleeve 20 and spaced from one another about the hole 28 to define a passage. In this embodiment, the filler 22 is only disposed on the sleeve 20 in the space between the seals 32.

Regardless of whether the sleeve 20 includes grooves 24 or is formed without grooves 24, various types of sleeves 20 may be used in accordance with the subject invention. For instance, the sleeve 20 may have a unitary configuration. In other words, the sleeve 20 may be formed from a sheet that is disposed around the inner jacket 18. The predetermined frictional force is dependent upon how tightly the sheet is wrapped around the inner jacket 18. As shown in FIGS. 3 and 4, in another embodiment, the sleeve 20 may include a plurality of segments 36. The sleeve 20 may include the grooves 24 regardless of whether the sleeve 20 is formed from a sheet or has segments 36 connected by hinges 38. In the embodiment having the segments 36, at least one hinge 38 is coupled between each of the segments 36 for adjusting the predetermined frictional force exerted on the inner jacket 18 opposing the telescoping movement. Each of the plurality of segments 36 has a cross-section to fit around the inner jacket 18. For instance, if the inner jacket 18 has a circular cross-section, then the segments 36 have a circular cross-section when coupled together. Therefore, each individual segment has a semi-circular cross-sectional configuration. The plurality of segments 36 may be tightened or loosened to adjust the predetermined frictional force exerted on the inner jacket 18 opposing the telescoping movement. Those skilled in the art realize that the segments 36 may have any cross-section to fit between the inner jacket 18 and the outer jacket 12. Also, the sleeve 20 may include a first segment 40 and a last segment 42 that overlaps the first segment 40. Each of the first and last segments 40, 42 may include recessed portions. The overflow gap 30 previously described may be defined by a space between the recessed portions of the first segment 40 and the last segment 42. In other words, the width of the overflow gap 30 may be dependent upon how tightly the sleeve 20 is disposed on the inner jacket 18.

Figure 5:
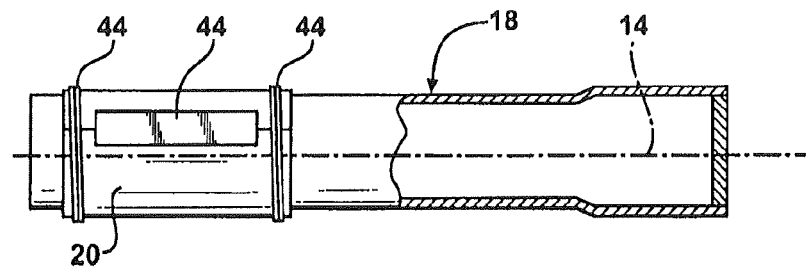
FIG. 5 is a side view of the sleeve of FIG. 1 mounted to the inner jacket with a fastener before being inserted into the outer jacket.

Referring now to FIG. 5, in either of the embodiments described above, the sleeve 20 includes a fastener 44 for securing the sleeve 20 to the inner jacket 18 with the predetermined frictional force opposing the telescoping movement. In other words, the fastener 44 holds the sleeve 20 onto the inner jacket 18 until the filler 22 is disposed between the sleeve 20 and the outer jacket 12. Once the sleeve 20 is disposed on the inner jacket 18, it is tightened or loosened to exert the predetermined frictional force. Then, the sleeve 20 is held in place with the fastener 44 to exert the predetermined frictional force on the inner jacket 18 until the filler 22 is disposed between the sleeve 20 and the outer jacket 12 to hold the sleeve 20 in place with the predetermined frictional force. Preferably, the fastener 44 is a tape or a band that wraps around the fastener 44, although the fastener 44 may be any fastener known in the art to hold the sleeve 20 onto the inner jacket 18.

The subject invention further discloses a method of forming the steering column assembly 10 to have telescoping movement. The method uses the outer jacket 12, the inner jacket 18, the sleeve 20, and the liquid thermosetting composition. The method includes disposing the inner jacket 18 into the outer jacket 12. Disposing the inner jacket 18 in the outer jacket 12 may be further defined as disposing the inner jacket 18 into the opening 16 of the outer jacket 12. Next, the method includes disposing the sleeve 20 between the inner and outer jackets 12, 18 to exert the predetermined frictional force on the inner jacket 18 opposing the telescoping movement. In the method, disposing the inner jacket 18 into the outer jacket 12 may be simultaneous with disposing the sleeve 20 between the inner and outer jacket 12, 18 since disposing the sleeve 20 onto the inner jacket 18 may be before the step of disposing the sleeve 20 between the inner and outer jacket 12, 18. For example, disposing the sleeve 20 on the inner jacket 18 may be further defined as wrapping the sleeve 20 around the inner jacket 18 before disposing the inner jacket 18 into the outer jacket 12.

Next, the method includes inserting the liquid thermosetting composition into the outer jacket 12 between the outer jacket 12 and the sleeve 20. The method also includes curing the liquid thermosetting composition to form the filler 22 and secure the sleeve 20 to the outer jacket 12 to maintain the predetermined frictional force opposing the telescoping movement. Inserting the liquid thermosetting composition may be further defined as inserting the resin, and curing the liquid thermosetting composition may be further defined as inserting the cross-linking agent after the step of inserting the resin. Alternatively, inserting the resin may be simultaneous with inserting the cross-linking agent. Inserting the resin simultaneously with the cross-linking agent may include mixing the resin with the cross-linking agent before inserting the liquid thermosetting composition. On the other hand, the resin and the cross-linking agent may be inserted into the outer jacket 12 simultaneously and mix inside the outer jacket 12.

As described above, the outer jacket 12 defines the opening 16. Therefore, as shown in FIG. 6, inserting the liquid thermosetting composition is further defined as pouring the liquid thermosetting composition into the opening 16 before curing the liquid thermosetting composition. Alternatively, as described above, the outer jacket 12 defines the hole 28. Therefore, as shown in FIG. 7, inserting the liquid thermosetting composition may be further defined as injecting the liquid thermosetting composition into the hole 28 before curing the liquid thermosetting composition. Here, the guide 34 may be disposed about the sleeve 20, and in this case, the method includes the step of inserting the guide 34 into the outer jacket 12 between the outer jacket 12 and the sleeve 20 to define a passage and to route the liquid thermosetting composition into the passage.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

Having thus described the invention, it is claimed:

1. A steering column assembly comprising:
    an outer jacket extending along a longitudinal axis;
    an inner jacket slideably disposed in said outer jacket for telescoping movement relative to said outer jacket along said longitudinal axis;
    a sleeve disposed between said inner and outer jackets along said longitudinal axis for exerting a predetermined frictional force on said inner jacket opposing the telescoping movement; and
    a filler formed from a liquid thermosetting composition disposed between said sleeve and said outer jacket for securing said sleeve to said outer jacket and for maintaining the predetermined frictional force exerted by said sleeve on said inner jacket.

2. A steering column assembly as set forth in claim 1 wherein said filler comprises the reaction product of a resin and a cross-linking agent.

3. A steering column assembly as set forth in claim 2 wherein said resin is further defined as an epoxy and said cross-linking agent is further defined as an anhydride.

4. A steering column assembly comprising:
    an outer jacket extending along a longitudinal axis;
    an inner jacket slideably disposed in said outer jacket for telescoping movement relative to said outer jacket along said longitudinal axis;
    a sleeve disposed between said inner and outer jackets along said longitudinal axis for exerting a predetermined frictional force on said inner jacket opposing the telescoping movement and said sleeve defining at least one groove; and
    a filler disposed in said at least one groove between said sleeve and said outer jacket for securing said sleeve to said outer jacket and for maintaining the predetermined frictional force exerted by said sleeve on said inner jacket.

5. A steering column assembly as set forth in claim 4, wherein said sleeve defines an outer perimeter and said at least one groove extends around said outer perimeter of said sleeve.

6. A steering column assembly as set forth in claim 4, wherein said sleeve defines an outer perimeter and wherein said at least one groove is further defined as a plurality of grooves spaced from one another around said outer perimeter of said sleeve.

7. A steering column assembly as set forth in claim 4, wherein said outer jacket defines a hole aligned with said grove and in communication with said groove.

8. A steering column assembly as set forth in claim 4, wherein said sleeve defines an overflow gap in communication with said at least one groove.

9. A steering column assembly as set forth in claim 4, wherein said sleeve has a unitary configuration.

10. A steering column assembly as set forth in claim 4, wherein said sleeve includes a plurality of segments and at least one hinge coupled between each of said segments for adjusting the predetermined frictional force exerted on said inner jacket opposing the telescoping movement.

* * * * *